June 19, 1928.
B. F. SCHMIDT
1,673,952
DASH MOUNTED GEAR SHIFT MECHANISM
Filed July 11, 1927
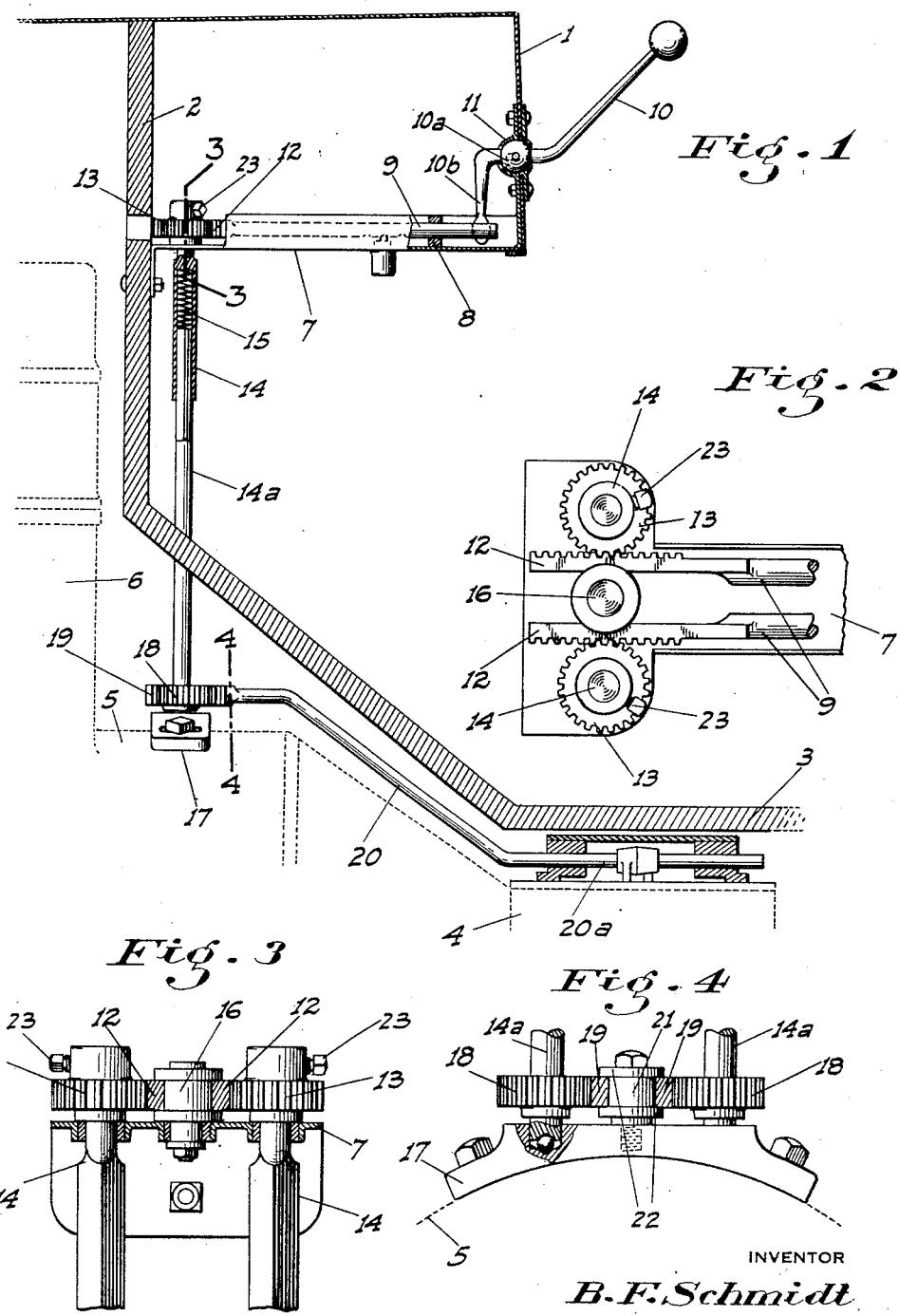
INVENTOR
B. F. Schmidt
BY
ATTORNEY Patented June 19, 1928.

1,673,952

UNITED STATES PATENT OFFICE.

BENJAMIN F. SCHMIDT, OF LOS ANGELES, CALIFORNIA.

DASH-MOUNTED GEAR-SHIFT MECHANISM.

Application filed July 11, 1927. Serial No. 204,732.

This invention relates to gear shift mechanisms of motor vehicles, and particularly to one in which the operating lever is mounted on the dashboard of the vehicle; the present invention representing modifications of the connecting and operating structure between the shift rods of the transmission and the corresponding rods actually engaged by the shift lever on the dash, over what is shown in my co-pending application for patent, Serial No. 160,365, filed January 11th, 1927.

The principal objects of the present invention are to provide a mechanism for the purpose in which the number of parts is lessened over what was previously provided; a tendency to develop loose play with long usage is decreased, and the device may be more readily applied as an attachment to a standard vehicle.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved gear shifting structure shown as installed in a motor vehicle.

Fig. 2 is a top plan view of the upper portion of the operating mechanism.

Fig. 3 is a vertical cross section of the upper portion of such mechanism taken on the line 3—3 of Fig. 1.

Fig. 4 is a similar view of the lower portion of the mechanism taken on the line 4—4 of Fig. 1.

Referring now more particularly to the characters of reference on the drawings, the numeral 1 denotes the dashboard of a motor vehicle; 2 the engine bulkhead which as usual is a certain distance ahead of the dashboard; 3 is the floor of the driver's compartment of the vehicle; 4 the transmission housing under the floor and 5 is the flywheel housing of the engine 6, said housing being located under the bulkhead 2. My improved gear shift mechanism to shift the usual gears in the housing 4 in the usual manner comprises a supporting plate 7 arranged to extend longitudinally of the vehicle from the front of the dashboard to the back of the bulkhead 2, and bolted to both. This plate is disposed centrally of the width of the car, or in vertical alinement with the transmission mechanism. Slidable in bearings 8 fixed on the plate and projecting toward the forward end thereof is a pair of horizontal transversely spaced rods 9 adapted to be selectively engaged adjacent their rear ends by the lower end of the operating lever.

This lever comprises an upper handle portion 10, which terminates at its lower end in a substantially horizontal and forwardly facing direction; a ball $10^a$ at such lower end and ahead of the same; and a rod engaging portion $10^b$ projecting forwardly from the ball a short distance and being then bent straight down to its lower end. The ball is swively mounted in the usual manner in a cupped seat or socket 11 formed with the plate 7 at the rear end thereof and projecting upwardly therefrom to abut against and be secured to the forward face of the dashboard; the axis of the seat being at right angles to the dashboard. The handle portion of the lever projects through the front of the dashboard so that it is sufficiently clear of the same to be properly manipulated, and it is set so that its angular position is substantially the same as that of the usual floor lever, and the shifting movements take place in the same direction as those of the usual lever.

The forward ends of the rods are formed with vertical oppositely facing racks 12 which engage pinions 13 mounted on separate transversely spaced vertical shaft units which are disposed a short distance rearwardly of the bulkhead. Each shaft unit comprises upper and lower portions 14 and $14^a$ respectively telescopically mounted with each other for relative sliding movement but so that they must turn together; a compression spring 15 being placed between the sections. The racks are kept from possible transverse and vertical movement away from the pinions by a roller 16 disposed between said racks and mounted on the plate 7.

The lower ends of the shaft sections $14^a$ are socketed in a saddle 17 whose under surface follows the contour of the flywheel housing 5 and is adapted to be bolted thereto.

By reason of the telescoping shaft units provision is made for any vertical play between the upper sections (supported by the body structure), and the lower sections (supported by the power plant unit). This is necessary when this unit is spring or rubber suspended from the frame, as is now frequently done. The springs, constantly pressing the shaft sections apart, always hold the sections 14$^a$ seated in the saddle, and eliminate any tendency of the sections to rattle.

Pinions 18 preferably the same size as the pinions 13, are fixed on the shaft sections 14$^a$ just above the saddle, the pinions engaging oppositely disposed racks 19 (which are mounted in the same positions relative to each other as are the racks 12) and which are formed on the forward ends of rods 20 which are attached to or formed as parts of the gear shifting rods 20$^a$ projecting from the transmission housing. To maintain the racks 19 in proper engagement with the pinions and prevent possible vertical movement thereof a roller 21 is mounted on the saddle between the racks to engage their adjacent faces, said roller having top and bottom flanges 22 to guide the racks in their horizontal movement. It will therefore be seen that with the shifting of either rod 9 in a certain direction, the corresponding rod 20$^a$ will be shifted in the same direction and to the same extend, so that gear shifting operations are affected in the same manner as with the ordinary standard shift.

While the two sets of pinions are shown and described as being the same size, it will be obvious that their relative sizes may be different if desired to have a greater movement of the rods 20$^a$ than the rods 9, or vice versa. Also, one set of racks can be on the opposite side of the pinions from the other racks if it is desired to reverse the direction of shifting.

The upper pinions 13 are secured to the shaft sections 14 by set screws 23. This permits adjustments to be made during installation or whenever necessary so as to insure the neutral position of the actual gear shifting rods in the transmission being coordinated with the neutral positions of the upper rods 9.

From the foregoing description of the device it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A gear-shift mechanism for a motor vehicle including a horizontal longitudinally movable rod, means for supporting the rod from the dash board of the vehicle, lever means associated with the supporting means for moving the rod, a vertical shaft mounted ahead of the dashboard, a longitudinally movable member connected to and projecting forwardly from a gear-shift fork of the transmission mechanism of the vehicle, gearing connections between said rod and the shaft, and gearing connections between the shaft and said member arranged to cause a movement of the rod in one direction to impart movement to said member in the same direction.

2. A gear-shift mechanism for a motor vehicle including a horizontal longitudinally movable rod, mean for supporting the rod from the dashboard of the vehicle, lever means associated with the supporting means for moving the rod, a vertical shaft mounted ahead of the dashboard, a longitudinally movable member connected to and projecting forwardly from a gear-shift fork of the transmission mechanism of the vehicle, a rack on the forward end of the rod, a pinion on the shaft engaged by the rack, a rack on the forward end of said member, and a pinion on the shaft engaging said last named rack.

3. A structure as in claim 2; the pinions being the same size and the racks being similarly disposed relative to each other with respect to their engagement with the pinions.

4. A gear-shift mechanism for a motor vehicle including a horizontal longitudinally movable rod, means for supporting the rod from the dashboard of the vehicle, lever means associated with the supporting means for moving the rod, a vertical shaft mounted ahead of the dashboard, a longitudinally movable member connected to and projecting forwardly from a gear-shift fork of the transmission mechanism of the vehicle, operative connections between the rod and shaft and between the shaft and member to cause the latter to be moved with the movement of the rod, and a saddle to be fixed onto the fly-wheel housing of the engine of the vehicle to support the lower ends of the shaft.

5. A gear-shift mechanism for a motor vehicle including a horizontal longitudinally movable rod, means for supporting the rod from the dashboard of the vehicle, lever means associated with the supporting means for moving the rod, a vertical shaft mounted ahead of the dashboard, a longitudinally movable member connected to and projecting forwardly from a gear-shift fork of the transmission mechanism of the vehicle, operative connections between the rod and shaft, a rack on the forward end of said member, a pinion on the shaft engaged by the rack, and a roller mounted in a fixed position relative to the shaft to engage the outer face of the rack and having top and bottom flanges to guide the corresponding faces of the rack.

6. A gear-shift mechanism for a motor vehicle including a horizontal longitudinally movable rod, means for supporting the rod from the dashboard of the vehicle, lever means associated with the supporting means for moving the rod, a vertical shaft mounted ahead of the dashboard, a longitudinally movable member connected to and projecting forwardly from a gear-shift fork of the transmission mechanism of the vehicle, operative connections between the rod and shaft, a rack on the forward end of said member, a pinion on the shaft engaged by the rack, a saddle to be mounted on the vehicle to support the lower end of the shaft, and a roller to engage the outer face of the rack mounted on the saddle.

7. A gear-shift mechanism for a motor vehicle including a horizontal longitudinally movable rod, means for supporting the rod from the dashboard of the vehicle, lever means associated with the supporting means for moving the rod, a vertical shaft mounted ahead of the dashboard, a longitudinally movable member connected to and projecting forwardly from a gear-shift fork of the transmission mechanism of the vehicle, gearing connections between said rod and the shaft, and gearing connections between the shaft and said member arranged to cause a longitudinal movement of the rod to impart longitudinal movement to said member.

8. A gear-shift mechanism for a motor vehicle including a longitudinally movable rod, means for supporting the rod from the dashboard of the vehicle, lever means associated with the supporting means for moving the rod, a longitudinally movable member connected to a gear shift fork of the transmission mechanism of the vehicle, a vertical shaft structure, said structure comprising telescopic sections turnable as a unit, the upper section being journaled in the supporting means; means supporting the lower section from the power plant of the vehicle, and operative connections between said rod and the upper section and between the lower section and said member.

In testimony whereof I affix my signature.

BENJAMIN F. SCHMIDT.